United States Patent [19]

Cluett et al.

[11] 4,377,540
[45] Mar. 22, 1983

[54] CONTROL OF TUBULAR FILM SIZE

[75] Inventors: Ronald D. Cluett, Gloucester; Richard L. Mitchell, Manchester, both of Mass.

[73] Assignee: Gloucester Engineering Co., Inc., Gloucester, Mass.

[21] Appl. No.: 295,648

[22] Filed: Aug. 24, 1981

[51] Int. Cl.³ .............................................. B29D 7/22
[52] U.S. Cl. .................................... 264/23; 264/40.1; 264/40.3; 264/564; 425/140; 425/155; 425/174.2; 425/326.1
[58] Field of Search ..................... 264/40.3, 40.2, 40.1, 264/23, 564; 425/155, 174.2, 326.1

[56] References Cited

U.S. PATENT DOCUMENTS

| | | | |
|---|---|---|---|
| 2,816,837 | 12/1957 | Holsman | 425/140 |
| 2,952,875 | 9/1960 | Herrick | 425/140 |
| 3,159,698 | 12/1964 | Suh et al. | 264/210 R |
| 3,170,011 | 2/1965 | Cheney et al. | 264/564 |
| 3,341,888 | 9/1967 | Bridge et al. | 425/140 |
| 3,400,184 | 9/1968 | Matsuo et al. | 264/569 |
| 3,474,160 | 10/1969 | Doering | 264/401 |
| 3,499,064 | 3/1970 | Tsuboshima et al. | 425/140 |
| 3,513,501 | 5/1970 | Hearns | 425/140 |
| 3,700,370 | 10/1972 | Hearns et al. | 425/140 |
| 3,914,356 | 10/1975 | Dembiak et al. | 425/140 |
| 3,932,080 | 1/1976 | Uemura et al. | 425/140 |
| 3,980,418 | 9/1976 | Schott, Jr. | 425/455 R |
| 4,061,456 | 12/1977 | Mulder | 425/140 |
| 4,152,380 | 5/1979 | Graves et al. | 264/40.1 |
| 4,189,288 | 2/1980 | Halter | 264/40.1 |
| 4,236,884 | 12/1980 | Schott, Jr. | 425/72 R |
| 4,243,363 | 1/1981 | Mulcahy | 425/140 |
| 4,325,897 | 4/1982 | Zerle et al. | 425/140 |

FOREIGN PATENT DOCUMENTS

| | | |
|---|---|---|
| 2505221 | 8/1976 | Fed. Rep. of Germany ...... 425/141 |
| 51-59957 | 5/1976 | Japan ..................................... 264/23 |
| 1038289 | of 0000 | United Kingdom . |

OTHER PUBLICATIONS

"Ultrasonic Ranging Systems", Polaroid Corporation, Jul. 1980.
C. Biber et al., "The Polaroid Ultrasonic Ranging System", Polaroid Corporation, pp. 2-11 and FIGS. 1-19.
Polaroid, "Technical Specifications for Polaroid Electrostatic Transducer".
Maslin, Gerald D., Polaroid Corporation form letter regarding Ultrasonic Ranging System.
Horneman, Anton, "Polaroid's SX-70 Technology: Sonar for Inventors", Science & Mechanics, Pub. 106, 1980.

Primary Examiner—Jeffery R. Thurlow

[57] ABSTRACT

An internally cooled blown film system, for producing a plastic tube, in which the flow rate of the continuous flow of cooling air through the tube is made directly dependent upon deviation of the tube circumference as determined by transmission and detection of ultrasonic waves from the surface of the tube.

17 Claims, 11 Drawing Figures

CONTROL OF TUBULAR FILM SIZE

FIELD OF THE INVENTION

This invention relates to apparatus for controlling the circumference of blown film.

BACKGROUND OF THE INVENTION

Blown-film apparatus is used to manufacture plastic sheets, bags and the like. A molten tube of plastic is extruded from an annular die and then stretched and expanded to a larger diameter and a reduced thickness by the action of overhead nip rolls and internal air pressure.

To control the circumference of the finished tube, it is generally necessary to adjust the volume of air captured and held inside the tube between the annular die and the overhead nip rolls. It has been conventional to adjust the entrapped volume of air by operating valves in the small inflation line connected to the tube interior, i.e. to add or remove small amounts of the entrapped air. These valves were opened and closed in response to measurements of tube size.

Some of these inflation systems measured tube size using optical beams tangent to the tube and incident upon photocells, e.g. Uemura et al., U.S. Pat. No. 3,932,080; Suh et al., U.S. Pat. No. 3,159,698; Tsuboshima et al., U.S. Pat. No. 3,499,064; and Matsuo et al., U.S. Pat. No. 3,400,184.

Mechanical feelers have also been used to control the entrapped volume, e.g. Hearns et al., U.S. Pat. No. 3,700,370.

To increase production speeds of blown film lines, a continuous stream of cooling air has been admitted into the tube through passages in the die, directed against the inner wall of the tube and removed through passages in the die. In such dies, in order to regulate the flow rate in a dynamic manner a mechanical feeler that follows the wall of the tube may be used. Schott, U.S. Pat. No. 3,980,418, shows a single feeler mechanically connected to a pneumatic regulator valve which, through a pneumatic cylinder, proportionally controls a flapper valve in the internal air supply line. As with all mechanical feelers, however, deformations are left in the film and a degree of inaccuracy must exist due to the need of the film to apply pressure to the feeler in order to produce a response. Furthermore, with such feelers, tube size measurements must be made beyond the molten region of the tube to avoid serious deformations in the tube wall as the result of contact and locallized cooling by the feelers. Making the measurement away from the molten region can introduce detrimental delay into the control system, and reduce accuracy.

In another system for controlling tube size in a film line employing a continuous stream of cooling air (shown in the assignee's copending application of Schott, Ser. No. 250,617, filed Apr. 3, 1981 (C.I.P. of Ser. No. 964,983, abandoned filed Nov. 30, 1978), entitled "Control of Tubular Film Size"), surface deformations are avoided by use of a tangential energy beam system to sense tube diameter in the molten region within a tube diameter range of 1.25 inches, without repositioning the sensors. Air flow into the tube is regulated by a control circuit operating a motorized valve in the cooling air duct, as described in Mulcahy, U.S. Pat. No. 4,243,363.

It is an objective of this invention to provide improved gauging and controlling apparatus for blown film extruder systems employing a continuous stream of cooling air that monitors tube diameter over a wide range of values without repositioning. It is a further objective to provide an apparatus capable of determining the tube circumference close to the frost line, without deforming or locally cooling the tube, for prompt and accurate control of internal cooling air flow.

SUMMARY OF THE INVENTION

The invention therefore relates to a blown tube extruder system including an annular tube forming die, an internal air cooling means for supplying a continuous flow of cooling air to the interior of the extruded tube and exhausting heated air from the tube, and a means for pulling the extruded tube from the annular die along a predetermined path, an apparatus for gauging and controlling the circumference of the extruded tube.

According to the invention, the gauging and controlling apparatus comprises at least one ultrasonic transducer means disposed in a determined position along the side of the extruded tube and directed substantially normally to the surface of the tube, means for performing a measurement cycle comprising energizing the transducer means to transmit a sonic pulse to and receive a return pulse from the surface of the tube and measure the time elapsed on the transit of the pulse to determine the distance from the transducer to the opposed surface of the extruded tube, and means responsive to the determination for varying the quantity of air within the extruded tube for controlling the size of the tube. Also according to the invention, a method for gauging and controlling the circumference of an extruded tube is provided using the ultrasonic transducer means to perform a measurement cycle to determine the distance from the transducer means to the tube surface and varying the quantity of air within the tube in response to this determination to control the size of the tube.

In preferred embodiments, the apparatus is comprised of at least two ultrasonic transducer means disposed at spaced positions about the tube, preferably means are provided for causing the spaced transducer means each to perform its pulse transmit and receive function at a time different from the other transducer means thereby to avoid interference between them, more preferably at least one pair of the spaced apart ultrasonic transducer means are disposed at opposed ends of a diameter of the extruded tube at a known distance from each other, and the diameter of the extruder tube along the diameter is determined by the difference between the total of the distance from each transducer means to the respective opposed surface and the known distance between the pair of transducer means; each measurement cycle is conducted in a time interval of the order of 0.1 seconds; each transducer means is disposed on a line corresponding to a radius of the tube, each being spaced a predetermined distance from the tube surface of between about 10 to 30 inches, preferably the transducer means are positioned outside the extruded tube, and the distance is determined between each transducer means and the outer surface of the tube; the transducer means is located along the direction of movement of the tube a distance from the annular die at least equal to the distance required for the material of the tube to solidify; the means for performing a measurement cycle includes means for transmission by the transducer in the direction of the surface of an inaudible chirp which includes a plurality of frequencies, means for detecting the echo of the chirp returned from the surface, and means for determining the time differential between the time of transmission and the time of detection, preferably the plurality of frequencies include frequencies of at least one of the following: 60 kilohertz, 57 kilohertz, 53 kilohertz, and 50 kilohertz; at least two transducer means are provided, and means are provided for summing the time differentials for the individual transducer means within each measurement cycle, the sum of the time differentials being inversely proportional to the circumference of the extruded tube, preferably the means responsive to the determination for varying the quantity of air within the extruded tube comprises a control circuit adapted to operate a valve in the air cooling means; the operation and positioning of the valve being determined by a comparison of the summation with a predetermined design circumference of the extruded tube.

These and other objects and features of the invention will be understood from the following description of a preferred embodiment.

PREFERRED EMBODIMENT

The structure and operation of a preferred embodiment of the invention will now be described, after first briefly describing the drawings.

DRAWINGS

FIG. 5 is a block flow diagram of the circuitry of the control apparatus, while

STRUCTURE

Figure 1:
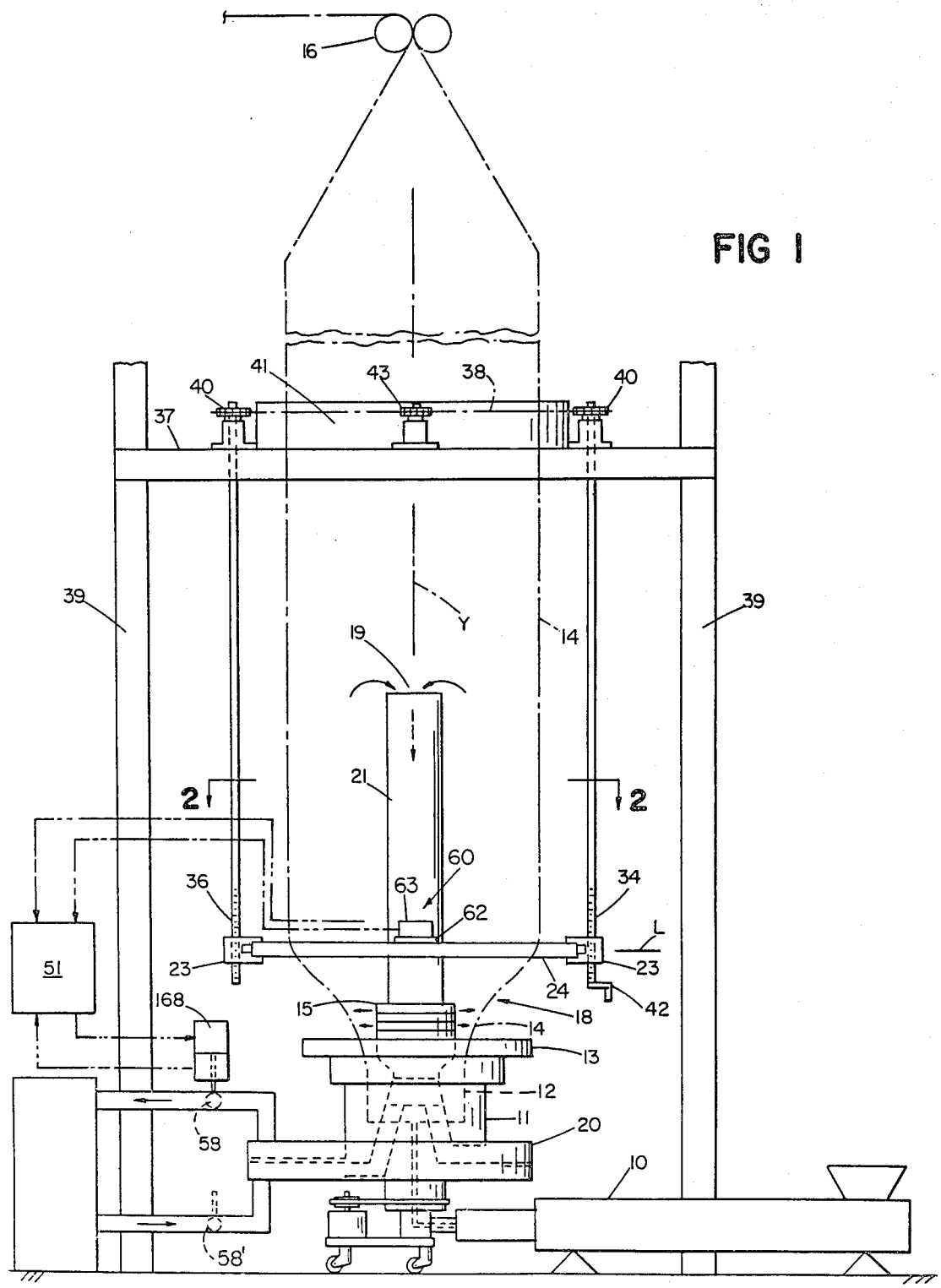
FIG. 1 is a diagrammatic elevation view of internally-cooled blown-film apparatus employing the tube circumference control apparatus of the invention.

Referring to FIG. 1, there is shown apparatus for producing blown film, such as for high quality plastic bags or sheeting. Plastic granules fed into a hopper are melted internally and fed by extruder 10 to die 11, where the plastic emerges from the annular die orifice 12 as a molten plastic tube 14. The tube is drawn upwardly by nip rolls 16, which stretch and flatten it. Other rolls transport the flattened tube to a storage roll (not shown). To evenly distribute circumferential irregularities in the thickness of the tube wall, caused by irregularities in die orifice 12, the die 11 is slowly rotated (about 1 rpm) about vertical axis Y, i.e. the center line of tube 14.

Figure 9:
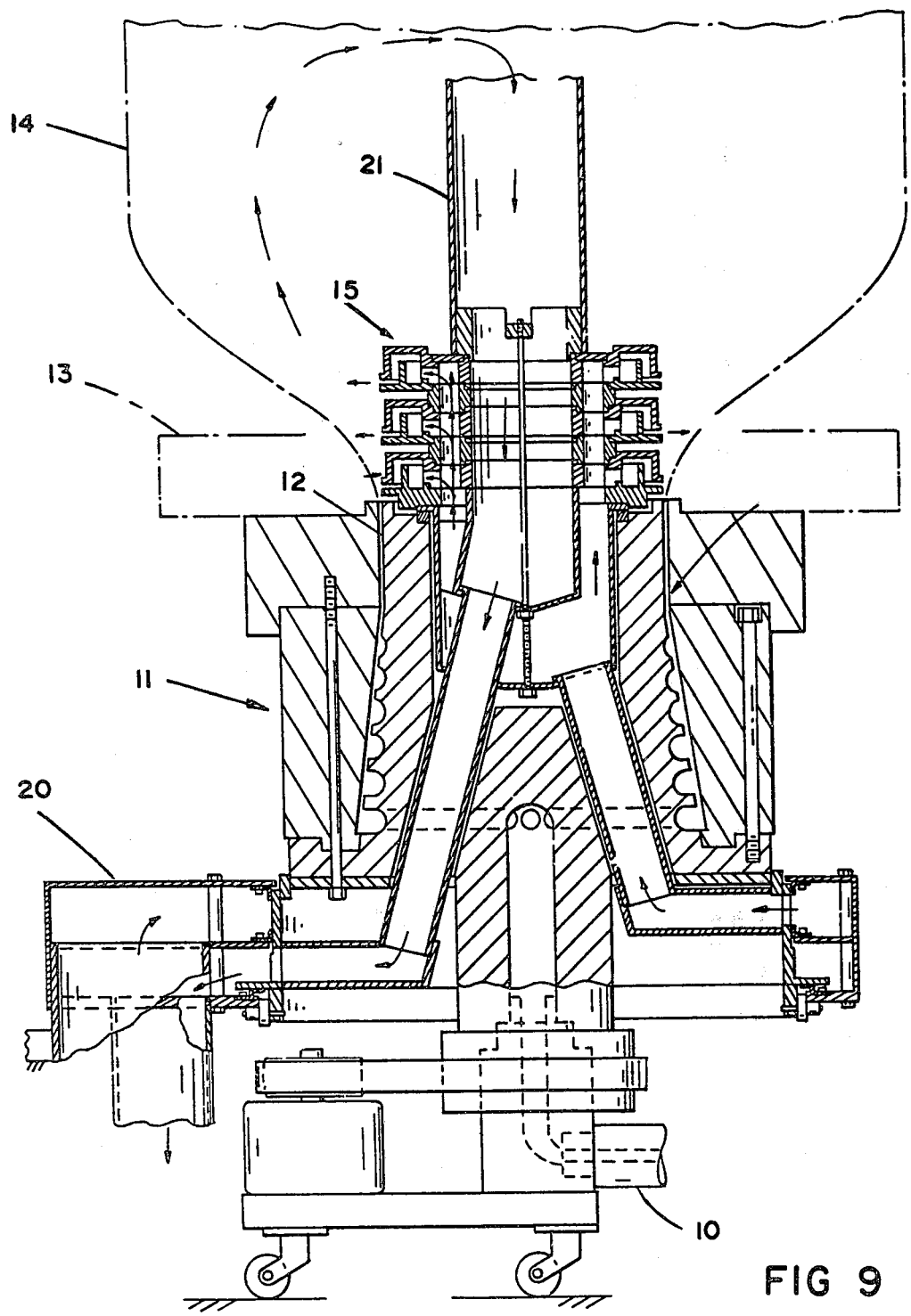
FIG. 9 is a vertical cross-section on an enlarged scale of the extrusion die with internal tube cooling shown in FIG. 1.

After the tube emerges from die orifice 12, and while it is still molten, it expands in region 18 from the die diameter (e.g., 12 inches) to the desired final diameter, which may vary typically between 2 and 3 times the orifice diameter. Both external and internal cooling air rings 13, 15 direct cool flowing air against the tube in expansion region 18. Internal cooling air is introduced to internal air ring 15 through passages in the die. Spent, warmed air is withdrawn through plenum 20, outlet 19 and pipe 21, and exits via passages in the die. The air passages through the die are shown in more detail in FIG. 9, and are described in more detail in Schott, U.S. Pat. No. 4,236,884. The tube is solidified at the so called frost line at level L, and has nearly reached its final diameter there.

Control over the final diameter of the tube is achieved by varying the flow rate at which internal cooling air is supplied or exhausted. Greater rates of flow produce higher internal pressures and higher captured volume of air within the tube, thereby more greatly expanding the tube. The draw rate of nip rolls 16 also influence the shape of the expansion region 18, tending to raise or lower level L.

The diameter of plastic tube 14 is measured by two diametrically opposed ultrasonic transducer assemblies 60 (FIG. 2), positioned just above level L where the final diameter typically is first reached. Transducer assemblies 60 are supported on arms 62 extending rapidly outward from lower ring 24 which in this embodiment is hung on support shafts 34, 36 from overhead platform 37 resting on posts 39. In retrofit situations such as overhead platform may already exist, e.g. to support nip rolls.

Figure 3:
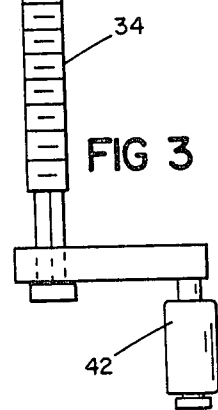
FIG. 3 is a vertical cross-sectional view at 3—3 in FIG. 2, showing the height adjustment mechanism.

Vertical adjustment of lower ring 24 and arms 62 carried thereon is provided by rotation of handle 42 fastened to shaft 34 (FIGS. 1, 3). Rotation handle 42 turns both shafts 34 and 36 in unison, and threads on the lower ends of both shafts engage threaded portions of feed blocks 23 fastened to lower ring 24, thereby raising and lowering the ring. Shafts 34, 36 turn in unison because sprockets 40 fixed to both shafts at their upper ends are coupled by upper chain 38 extending circumferentially around overhead platform 37. Additional idler sprockets 43 on upper ring 41 guide upper chain 38.

Figure 2:
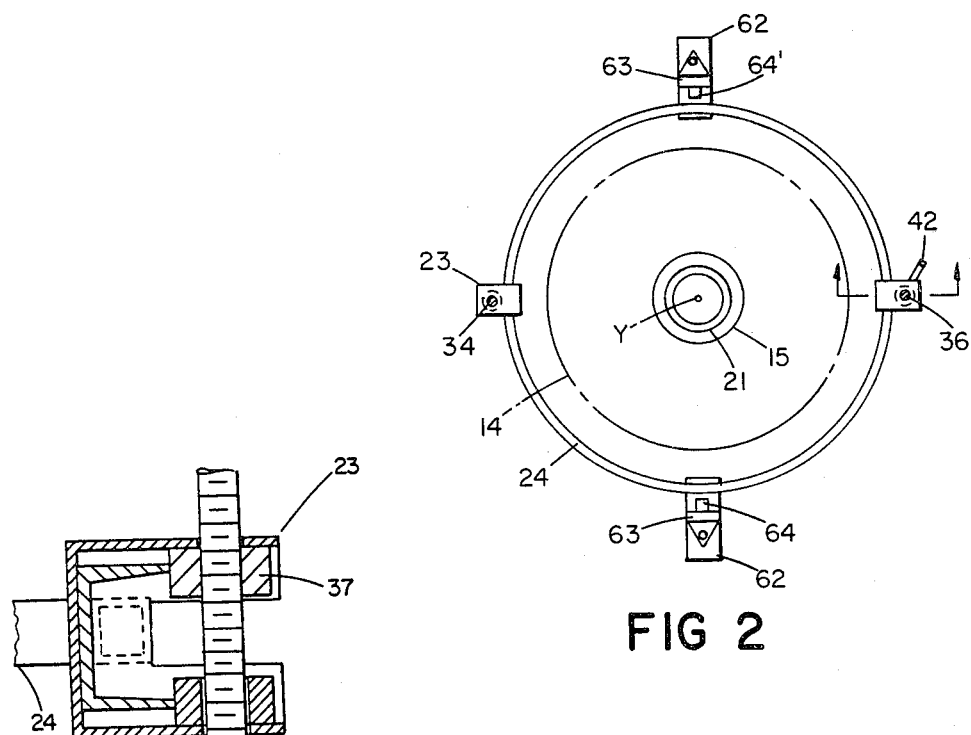
FIG. 2 is a horizontal cross-sectional view at 2—2 in FIG. 1, showing the tube wall position sensors.

Referring to FIG. 2, there is mounted on each radial arm 62, an electrostatic acoustical transducer 64, e.g. of the type supplied by Polaroid Corporation, of Cambridge, Mass., in their "Ultrasonic Ranging System"; which is capable, in combination with an ultrasonic circuit board, of acting, in turn, as both a loudspeaker and a microphone.

Figure 4:
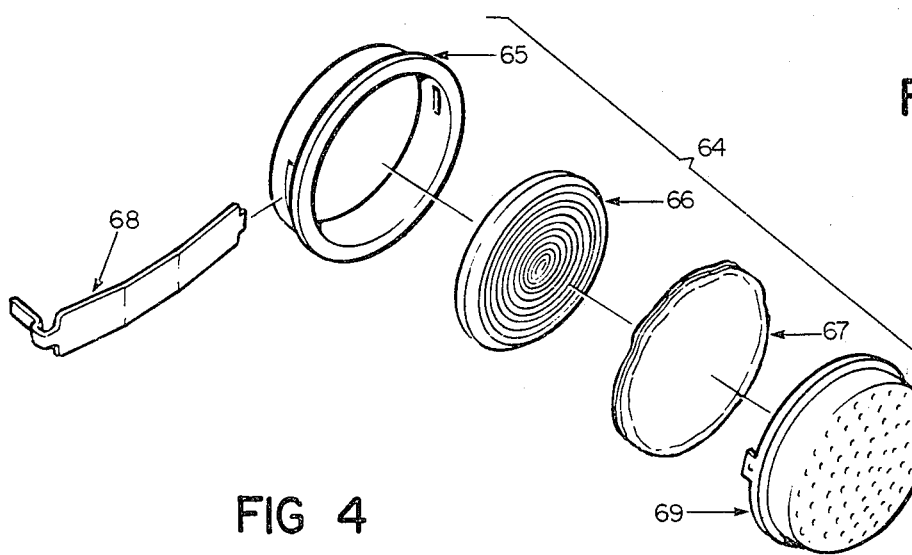
FIG. 4 is an exploded view of an electrostatic transducer.

Referring to FIG. 4, each transducer 64 consists of an inner ring 65, a grooved plate 66 which transforms electrical energy into sound, and a plastic covering sheet 67 coated with metal on one surface which, in cooperation with the grooved backplate 66, forms a capacitor. Retainer 68 holds the above elements in protective housing 69. Each transducer 64 is attached to frame 63 which is adjustable along arm 62 to vary the distance from tube center line Y. Each transducer is directed to the surface of tube 14.

Figure 6B:
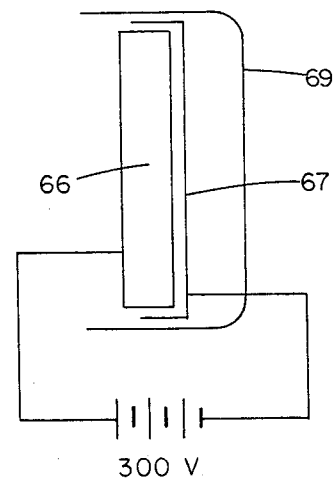
FIG. 6b is a similarly schematic view of the transducer circuitry.
Figure 5:
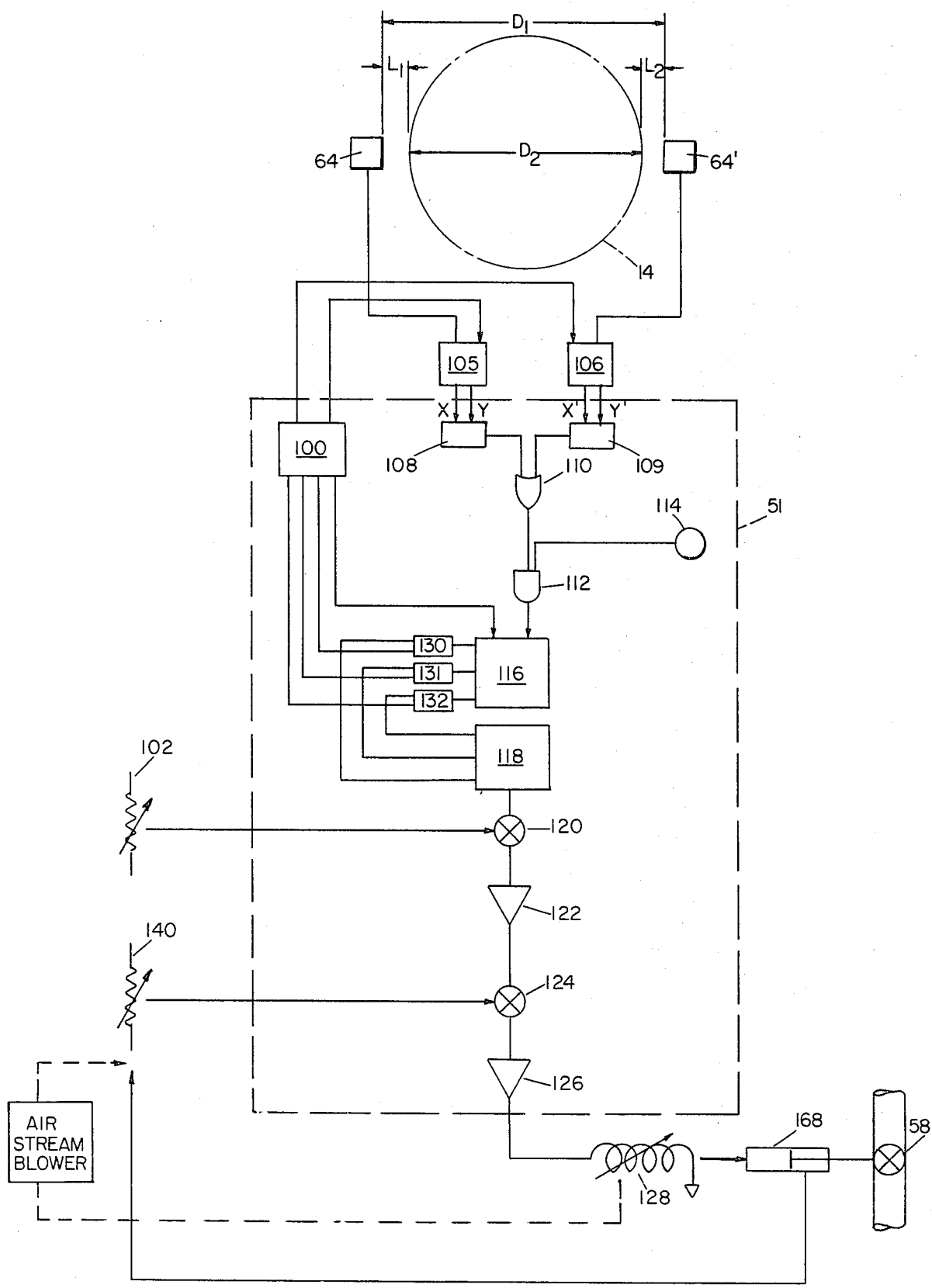
Figure 6:
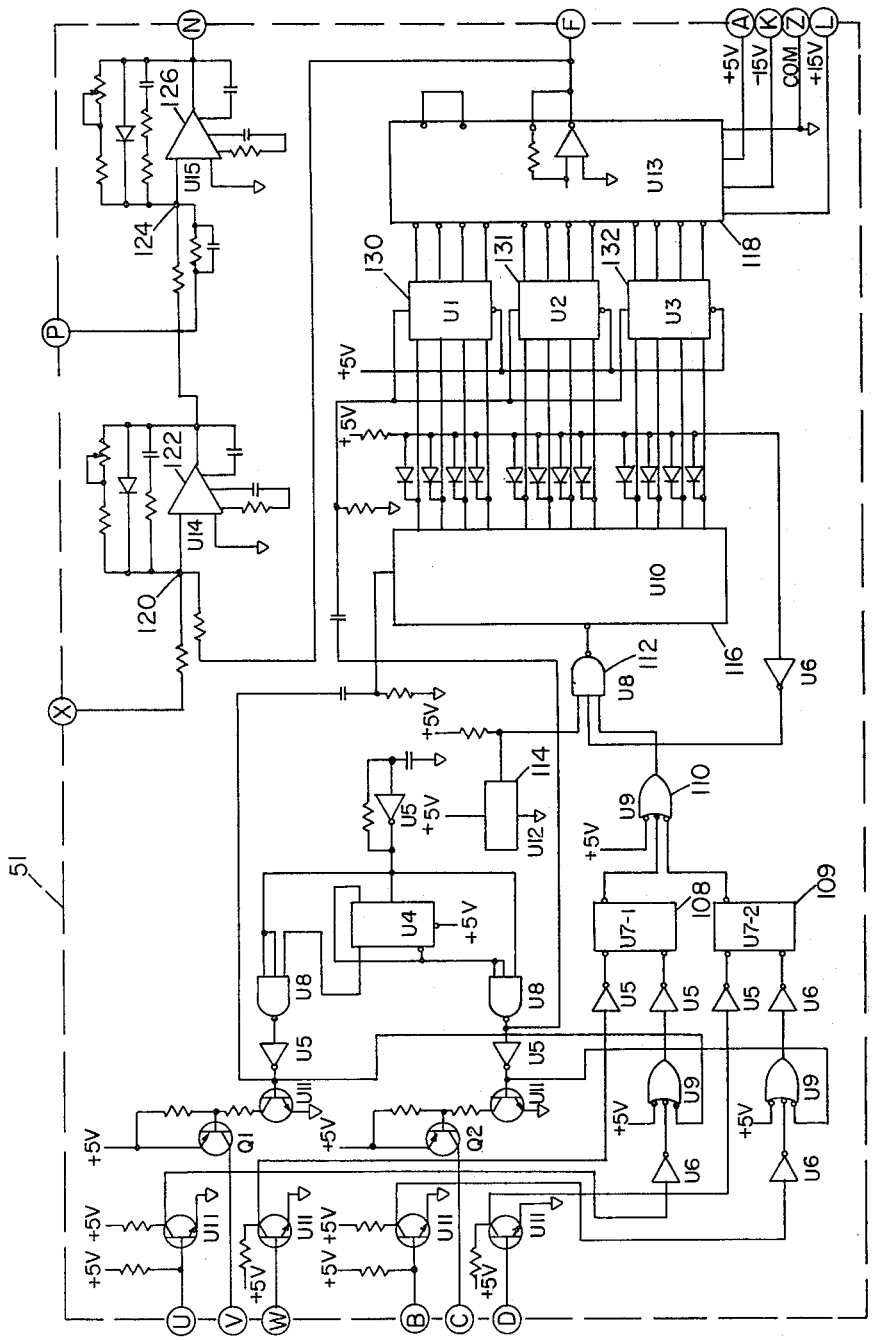
FIGS. 6 and 6a are schematic views thereof.
Figure 6A:
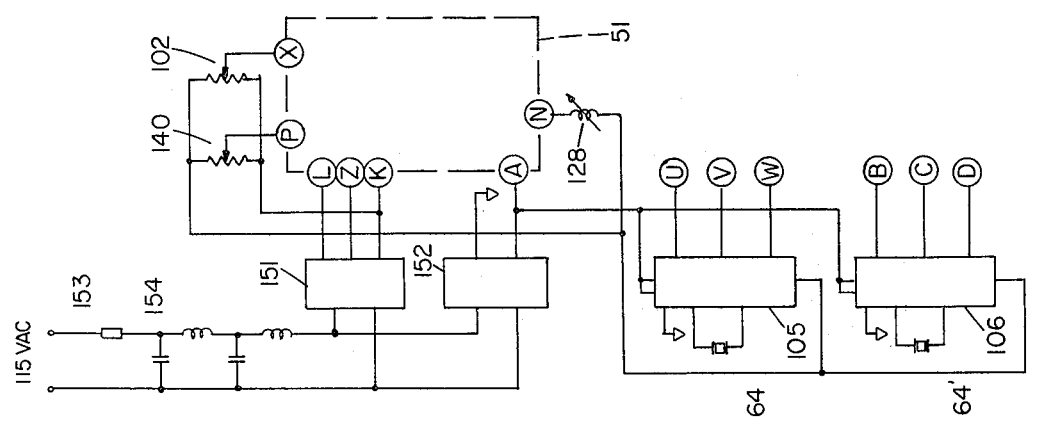

The electrical outposts of each transducer 64 is connected to control circuitry 51, which controls operation of transducers 64, 64' and receives signals back which it converts from an electrical signal to a pneumatic signal (by means of the circuitry shown in FIGS. 5 and 6) given to cylinder 168 which in turn controls the position of valve 58 in the internal cooling air outlet duct (or valve 58' in the internal cooling air inlet duct). The control circuitry further includes (FIG. 6a) external power supplies 151, 152 and filtering elements 153, 154 (necessary for outside noise immunity).

OPERATION

In operation, the circumference of tube 14 is maintained within a small tolerance of the desired value by adjusting the flow rate of air to or from the interior of the tube in proportion to the sensed deviation in circumference. Flow rate is adjusted by rotating flapper valve 58 in the outlet air stream, or rotating flapper valve 58' in the inlet air stream. Each valve's normal angular excursion is plus or minus 30 degrees from a normal 30 degree inclination to the flow. Small angular deflections are all that is normally required after the system automatically settles to the set point value. For example, an angular movement of 2 degrees can change a nominal flow rate of 600 cfm by about 8 cfm, which in turn can change the circumference of a 32 inch diameter tube by about 0.10 inches.

To begin operation of the blown film apparatus, the transducer assemblies 60 are positioned on arms 62. The optimal location for transducers 64 is at their midrange point, i.e. 21 inches (53.3 cm) from the tube surface at the desired diameter, to provide control over the widest range of tube diameter variation, i.e. 11 inches (27.9 cm) to 31 inches (78.7 cm) from the transducer to the tube surface. Both transducers are positioned approximately, e.g. within ½ inch (1.3 cm), equidistant from center line Y, but precise positioning is not required for accurate measurement. The control apparatus 51 is set for the nominal desired diameter of tube 14 by adjusting (with switch 100 in the off position) potentiometer 102 to the voltage corresponding to the approximate desired tube diameter, i.e. the total distance between transducers 64 and 64' and the surface of tube 14. Then the flow output of the air blower (not shown) is adjusted such that, with valve 58, or 58', in its normal 30 degree inclination, roughly the correct flow is delivered to the tube interior to produce the desired tube size. (Either inlet or exhaust blowers may be employed.)

Solid state switch 100 alternately energizes range boards 105, 106 (typically five times per second) which, in turn, respectively control transducers 64, 64'. The transducers 64, 64' are operated alternately, i.e. while one is activated, the other is at rest.

Figure 8:
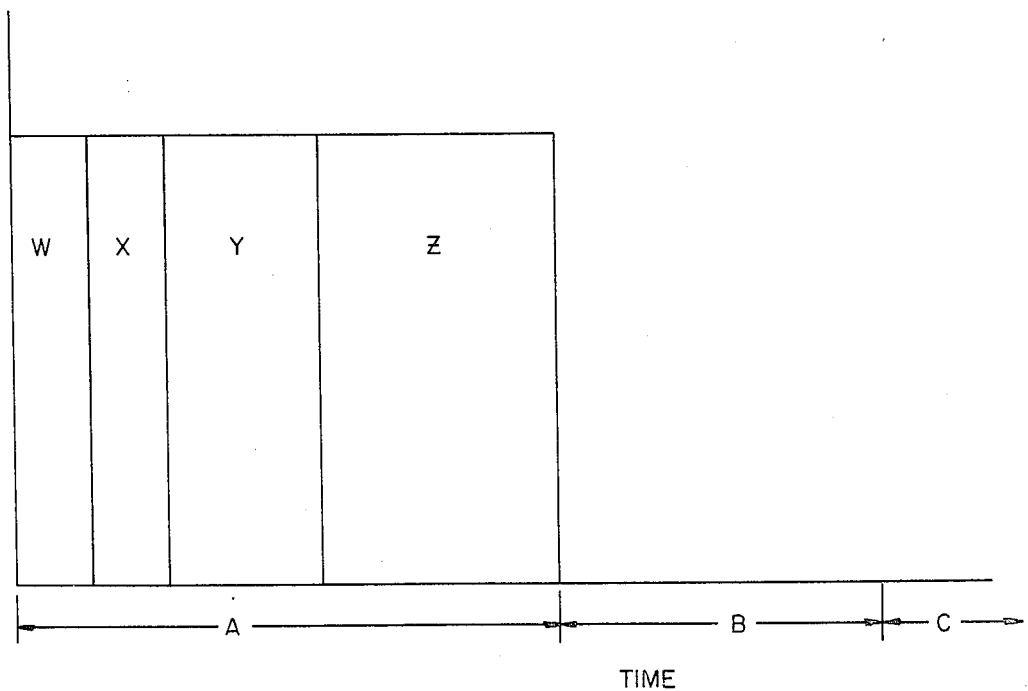
FIG. 8 is a representative graph of one measuring/detecting cycle of one transducer according to the preferred embodiment.

Range board 105 signals transducer 64 to begin its cycle. The cycle (FIG. 8) is comprised of a 1 millisecond transmit portion (A), during which the transducer emits a high frequency inaudible chirp consisting of 56 pulses at four (W, X, Y, Z) carefully chosen ultrasonic frequencies, i.e. eight cycles at 60 kilohertz (kHz), eight cycles at 57 kHz, sixteen cycles at 53 kHz and twenty-four cycles at 50 kHz; a "turn-around" portion (B) lasting 0.6 milliseconds, during which the transducer converts from a transmitter to a receiver; and a receive portion (C), during which the transducer listens for an echo of its transmitted signal reflected back from the surface of tube 14. A multiple frequency chirp is emitted because the topologies of different targets will absorb various frequencies, a sound pulse spread over the frequency range above ensures that some portion of those frequencies will be returned from the target. Each transducer operates from a minimum of 11 inches from the tube wall, to allow the minimum time for the transducer "turn around", to a maximum distance of the order of 31 inches, and will monitor and control a tube within that variation.

Range board 105 controls the voltage (in this case 300 volts) and the frequencies of the signal emitted by transducer 64. The voltage is applied (FIG. 6b) between grooved metal plate 66 and plastic film 67, which is metallized on one surface. The backplate 66 in contact with metallized film 67 forms a capacitor which, when charged, exerts an electrostatic force. Film 67, which acts as a diaphragm, i.e. a moving element, transforms this force from electrical energy into sound waves. After the "turn-around" delay period, the transducer becomes a receiver and the diaphragm 67 converts the echoed sound waves back into electrical energy.

Range board 105, upon issuing the transmit signal to transducer 64, simultaneously outputs a "transmit" flag (x) to flip-flop gate 108. This signal flag trips gate 108 and is input to OR gate 110 which will receive signals from either range board/transducer unit 105/64 or range board/transducer unit 106/64', but not from both simultaneously. During operation of range board/transducer unit 105/64, the second range board/transducer unit 106/64' is inactive, the units acting alternately.

OR gate 110 outputs the signal to AND gate 112, which also receives clock pulses from clock 114. The "transmit" signal opens AND gate 112 to allow clock pulse signals, typically at a 480 kilohertz rate, from clock 114 to be input to 12-bit binary counter 116 which counts the number of pulses received while AND gate 112 is open.

Transducer 64 emits the inaudible chirp for 1 millisecond then, on signal from range board 105, "turns around" from loudspeaker to microphone, which requires approximately 0.6 milliseconds. Transducer 64 then "listens" for a returning echo from the surface of tube 14 which is received on diaphragm 67 and converted into an electrical signal which is output to range board 105.

Range board 105 outputs a "receive" flag (y) which resets flip-flop gate 108 for the next cycle and is input to OR gate 110. (This signal passing through OR gate 110 causes it to reset.) OR gate 110 is now open to receive a cycle of "transmit" and "receive" flags from range board/transducer unit 106/64' through flip-flop gate 108 before the cycle is repeated. (A full measurement cycle is comprised of one reading from each transducer 64, 64' which are combined, as discussed below, for a more accurate indication of the diameter $D_2$ of tube 14 that is not sensitive to sway.)

The "receive" flag output to OR gate 110 from flip-flop gate 108 is received by AND gate 112, which is then closed to pulse signals from clock 114. The number of pulses received by binary counter 116 during the period while AND gate 112 was open, i.e. between "transmit" and "receive" flags, from range board/transducer unit 105/64, is proportional to the distance $L_1$ between transducer 64 and the surface of tube 14. AND gate 112 is again opened to clock pulses from clock 114 by the "transmit" signal (x') from range board/transducer unit 106/64', and binary counter sums the number of pulses received before the "receive" signal (y') from that unit again closes the AND gate. The number of pulses counted during the second period is proportional to the distance $L_2$ between transducer 64' and the surface of tube 14. The actual diameter $D_2$ of tube 14 is then proportional to the fixed distance $D_1$ between the transducers 64, 64' and the sum $(L_1+L_2)$ of distances from each transducer 64, 64' to the surface of tube 14, i.e. the number of clock pulses received by binary counter 116 through a full cycle of measurement by both range board/transducer units.

AND gate 112 also receives a return signal (a) from binary counter 116 if the 12-bit capacity of the counter is not exceeded to indicate that the total of distances $L_1$, $L_2$ has not become too great, e.g. if a signal is missed or a mechanical malfunction causes the tube to go out of range or collapse.

At the end of each measurement cycle, the output of binary counter 116 is latched to latches 130, 131, and 132 and the binary counter reset for the next cycle. Latches 130, 131 and 132 each retain a set of data for one cycle of measurement, i.e. one count cycle of binary counter 116, allowing the counter to begin the next cycle.

Figure 7:
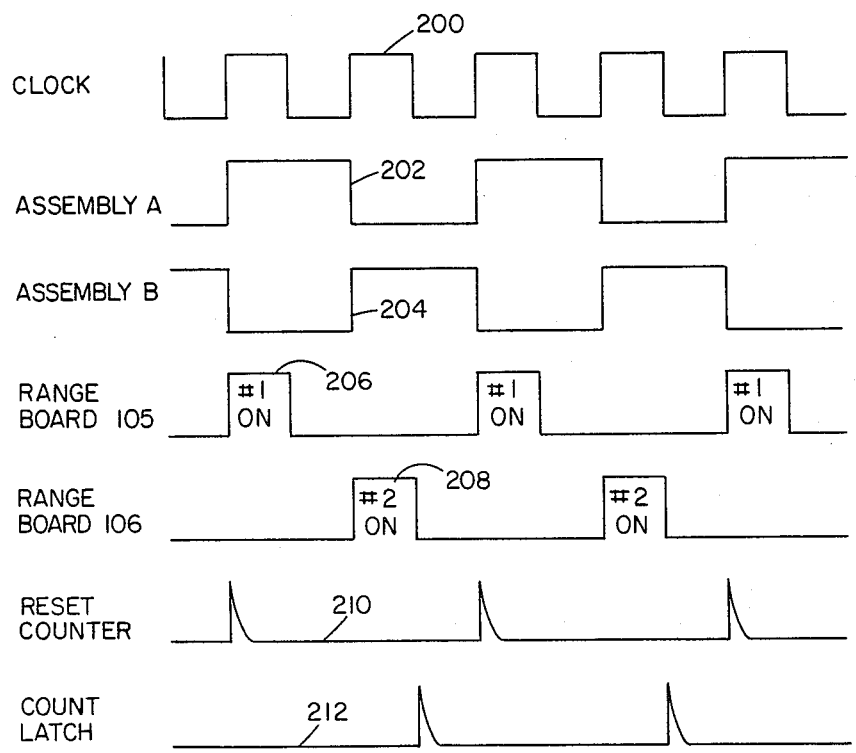
FIG. 7 is a representative graph of the timing sequence according to the preferred embodiment.

The operational sequence is illustrated in FIG. 7. Clock pulses (curve 200), typically of 57 millisecond duration with 62 milliseconds between each pulse are input to switch 100 (a transistorized switch included in the circuitry 51 of the apparatus) which emits a signal to range board 105 to activate and operate transducer assembly 64 through a measurement cycle. Switch 100 activates range board 105 for a 60 millisecond period and deactivates for a similar 60 millisecond period (curve 206) before activating range board 106 to operate transducer assembly 64' through its measurement cycle. Again switch 100 activates range board 106 for a 60 millisecond period and deactivates for a 60 millisecond period (curve 208) before repeating the entire cycle. Therefore each side of the system through flip flop gates 108, 109 operates alternately (curves 202, 204). Switch 100 also signals counter 116 to reset by means of a spike pulse (curve 210) emitted with the activate signal to the first range board 105, and signals latch counters 130, 131, 132 with a spike pulse (curve 212) at the end of the activation cycle of the second range board 106.

The output of counter 116, as fed through latches 130, 131, 132, is input to digital/analog converter 118 which converts the digital count into an analog voltage which is inversely proportional to the sum of the distance $L_1$, $L_2$ between the transducer 64, 64' and the surface of tube 14, i.e. the higher the count, the lower the voltage, and proportional to the diameter $D_2$ of the tube. This voltage is input to summing junction 120 of operational amplifier 122 where it is summed with a reference voltage input from potentiometer 102.

The value output by operational amplifier 122 constitutes a value proportional to the difference between the value output by the digital/analog converter 118 and the reference signal received from potentiometer 102.

This value is input to summing junction 124 of operational amplifier 126 which serves as the controller for electrical-to-pneumatic converter 128. Converter 128 supplies air to pneumatic cylinder 168 controlling damper valve 58 in the cooling air output stream. Summing junction 124 also receives input from feedback potentiometer 140 which is mechanically connected to damper 58. This loop signals the position of the damper 58 by converting the changes in the opening in the air stream exit passage to a reference voltage, i.e. a change in the position of damper 58 to open the passage and allow more air to exit and reduce the size of the tube results in a higher voltage reading at potentiometer 140.

Other Embodiments

Other embodiments of the invention are within the following claims. For example, other numbers of transducers may be employed according to the invention. These additional transducers may be employed in diametrically opposed pairs on the same or different planes perpendicular to the tube axis, or may be employed in other configurations. Additional transducer units may also require more involved circuitry with increased capacity in the binary counter and digital-to-analog converter. A single transducer may also be employed to achieve some of the benefits of the invention, but with some increased susceptibility to tube sway. One or more of the transducers may also be located within the tube to measure the distance to the interior surface.

Further, the control valve (58', FIG. 1) may be located in the cooling stream inlet line to allow control of the quantity of air within the tube by regulating the inlet flow of air, i.e. opening the valve would allow more air in and increase the tube size, while closing the valve would result in a smaller tube. Also, the valve may be held in a stationary position, e.g. 30 degree inclination to the flow, and the signal from feed back potientiometer (140, FIG. 5) used to control inlet or exhaust blower speed to vary the volume of air introduced into the tube and thereby control the circumference.

What is claimed is:

1. In a film extruder system in which film is extruded as a tube from an annular die and then pulled along a predetermined path, an apparatus for gauging and controlling the circumference of said extruded-film tube comprising
    one or more ultrasonic-ranging-transducer means spaced around the exterior of said tube and oriented so as to transmit and receive sonic pulses along paths generally normal to the surface of the tube,
    means for energizing each said transducer to transmit a sonic pulse to and receive a return pulse from the surface of said tube,
    means associated with each transducer for generating a range signal representative of the time required for said pulse to travel to and from said tube, and
    means responsive to said range signals for varying the quantity of air within said tube for controlling the tube diameter.

2. The gauging and controlling apparatus of claim 1 wherein said apparatus is comprised of at least two of said ultrasonic transducer means disposed at spaced positions about said tube.

3. The gauging and controlling apparatus of claim 2 wherein means are provided for causing the spaced transducer means each to perform its pulse transmit and receive function at a time different from the other transducer means thereby to avoid interference between them.

4. The gauging and controlling apparatus of claim 3 wherein at least one pair of said spaced apart ultrasonic transducer means are disposed at opposed ends of a diameter of said extruded tube at a known distance from each other, and the diameter of said extruded tube along said diameter is determined by the difference between the total of the distance from each said transducer means to the respective opposed surface and said known distance between said pair of transducer means.

5. The gauging and controlling apparatus of claim 3 wherein each measurement cycle is conducted in a time interval of the order of 0.1 seconds.

6. The gauging and controlling apparatus of claim 1 wherein each said transducer means is disposed on a line corresponding to a radius of said tube, each being spaced a predetermined distance from said tube surface of between about 10 to 30 inches.

7. The gauging and controlling apparatus of claim 6 wherein said transducer means are positioned outside said extruded tube, and said distance is determined between each said transducer means and the outer surface of said tube.

8. The gauging and controlling apparatus of claim 1 wherein said transducer means is located along the direction of movement of said tube a distance from said annular die at least equal to the distance required for the material of said tube to solidify.

9. The gauging and controlling apparatus of claim 1 wherein said means for performing a measurement cycle includes means for transmission by said transducer in the direction of said surface of an inaudible chirp which includes a plurality of frequencies, means for detecting the echo of said chirp returned from said surface, and means for determining the time differential between the time of said transmission and the time of said detection.

10. The gauging and controlling apparatus of claim 9 wherein said plurality of frequencies include frequencies of at least one of the following: 60 kilohertz, 57 kilohertz, 53 kilohertz, and 50 kilohertz.

11. The gauging and controlling apparatus of claim 9 wherein at least two transducer means are provided, and means are provided for summing said time differentials for said individual transducer means within each measurement cycle, the sum of said time differentials being inversely proportional to the circumference of said extruded tube.

12. In a film extruder system in which film is extruded as a tube from an annular die and then pulled along a predetermined path, a method for gauging and controlling the circumference of said extruded-film tube comprising the steps of disposing one or more ultrasonic-ranging-transducer means around the exterior of said tube and orienting them so as to transmit and receive sonic pulses along paths generally normal to the surface of the tube, performing a measurement cycle in which each said transducer transmits a sonic pulse to and receives a return pulse from the surface of said tube, generating a range signal representative of the time required for said pulse to travel to and from said tube, and varying the quantity of air within said tube in response to said range signals in order to control the tube diameter.

13. The method of claim 12 wherein said method includes the step of disposing at least two of said ultrasonic transducer means at spaced apart positions about said tube.

14. The method of claim 13 wherein said method includes causing said spaced transducer means each to perform its pulse transmit and receive functions at a time different from the other transducer means thereby to avoid interference between them.

15. The method of claim 14 wherein said method includes disposing at least one pair of said spaced apart transducer means at opposed ends of a diameter of said extruded tube at a known distance from each other, and determining the diameter of said extruded tube along said diameter by determining the difference between the total of the distances from each said transducer means to the respective opposed surface and the known distance between said pair of transducer means.

16. The method of claim 12 wherein said method includes disposing each said transducer means on a line corresponding to a radius of said tube, each being spaced at a predetermined distance from said tube surface of between about 10 to 30 inches.

17. The method of claim 16 wherein said method includes positioning said transducer means outside said extruded tube, and determining the distance between said transducers and the outer surface of said tube.

* * * * *